United States Patent
Starr et al.

(10) Patent No.: US 10,115,237 B2
(45) Date of Patent: Oct. 30, 2018

(54) VIRTUAL REALITY DISPLAY OF PIPE INSPECTION DATA

(71) Applicant: RedZone Robotics, Inc., Pittsburgh, PA (US)

(72) Inventors: Justin Starr, Baden, PA (US); Anthony van Iersel, Auckland (NZ); Timothy Renton, Auckland (NZ); John Lettman, Pittsburgh, PA (US); Todd Kueny, Tarentum, PA (US); Foster J. Salotti, Verona, PA (US)

(73) Assignee: RedZone Robotics, Inc., Pittsburgh, PA (US)

( * ) Notice: Subject to any disclaimer, the term of this patent is extended or adjusted under 35 U.S.C. 154(b) by 0 days.

(21) Appl. No.: 15/279,035

(22) Filed: Sep. 28, 2016

(65) Prior Publication Data

US 2018/0089896 A1 Mar. 29, 2018

(51) Int. Cl.
 *G06T 19/00* (2011.01)
 *G06F 3/01* (2006.01)
 *H04N 5/232* (2006.01)

(52) U.S. Cl.
 CPC ............ *G06T 19/006* (2013.01); *G06F 3/011* (2013.01); *H04N 5/23238* (2013.01)

(58) Field of Classification Search
 CPC .................... G06T 19/006; H04N 5/23238
 See application file for complete search history.

(56) References Cited

U.S. PATENT DOCUMENTS

| | | | |
|---|---|---|---|
| 5,771,041 A * | 6/1998 | Small | H04S 1/007 715/727 |
| 6,181,343 B1 * | 1/2001 | Lyons | A63F 13/10 715/850 |
| 2006/0290779 A1 * | 12/2006 | Reverte | E03F 7/10 348/84 |
| 2012/0197440 A1 | 8/2012 | Farkavec | |
| 2014/0066704 A1 * | 3/2014 | Blumenkranz | A61B 1/00154 600/103 |
| 2014/0267723 A1 * | 9/2014 | Davidson, Jr. | H04N 7/183 348/147 |
| 2016/0005229 A1 * | 1/2016 | Lee | G06F 3/0488 345/419 |
| 2017/0091939 A1 * | 3/2017 | Kluckner | G06T 7/0016 |
| 2017/0109422 A1 * | 4/2017 | Satkunarajah | G06F 17/30241 |
| 2018/0077210 A1 * | 3/2018 | Hannuksela | H04L 65/4076 |

FOREIGN PATENT DOCUMENTS

RU 133896 U1 10/2013

OTHER PUBLICATIONS

Vladimirova, T., International Search Report and Written Opinion of the International Searching Authority, PCT/US2017/053703, (dated Dec. 21, 2017), 9 pages.

* cited by examiner

*Primary Examiner* — Phi Hoang
(74) *Attorney, Agent, or Firm* — Cafardi, Ferguson, Wyrick, Weis + Stotler LLC; Andrew M. Gabriel

(57) ABSTRACT

One aspect provides a method of projecting pipe data into a virtual reality system, including: obtaining, using a pipe inspection robot, pipe data relating to one or more pipe segments in a pipe network; processing, using a processor, the pipe data to format the pipe data for virtual panoramic display; providing, using the processor, the formatted pipe data to a virtual reality system. Other aspects are described and claimed.

15 Claims, 3 Drawing Sheets

VIRTUAL REALITY DISPLAY OF PIPE INSPECTION DATA

BACKGROUND

Pipes that carry water, other fluids and gases are an important type of infrastructure. Pipes are often inspected as a matter of routine upkeep or in response to a noticed issue. A great deal of pipe data is captured in still images or video, e.g., using cameras to record information from the visible spectrum of light. However, other data can provide additional information beyond what is visible to the naked eye. For example, acoustic, ultraviolet (UV) and infrared (IR) imaging have been utilized to identify details related to pipe topology or condition.

Various systems exist that create pipe inspection data, for example obtained via a pipe inspection robot, in a variety of formats. Conventionally pipe inspection data is presented in a two-dimensional (2D) format as either still image data or video data. Some systems are capable of presenting three-dimensional (3D) information in the form of 3D-like graphics that are presented on a flat (2D) screen.

BRIEF SUMMARY

In summary, one aspect provides a method of projecting pipe data into a virtual reality system, comprising: obtaining, using a pipe inspection robot, pipe data relating to one or more pipe segments in a pipe network; processing, using a processor, the pipe data to format the pipe data for virtual panoramic display; providing, using the processor, the formatted pipe data to a virtual reality system.

Another aspect provides a system, comprising: a pipe inspection robot comprising at least one sensor that obtains pipe data relating to one or more pipe segments in a pipe network; and a computing device including a processor that: processes the pipe data to format the pipe data for virtual panoramic display; and provides the formatted pipe data to a virtual reality system.

A further aspect provides a computer program product, comprising: a computer readable storage device having code embodied therewith, the code being executable by a processor and comprising: code that receives input pipe data derived from a pipe inspection robot; and code that displays, on a head mounted display device, the pipe data as a virtual panoramic display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
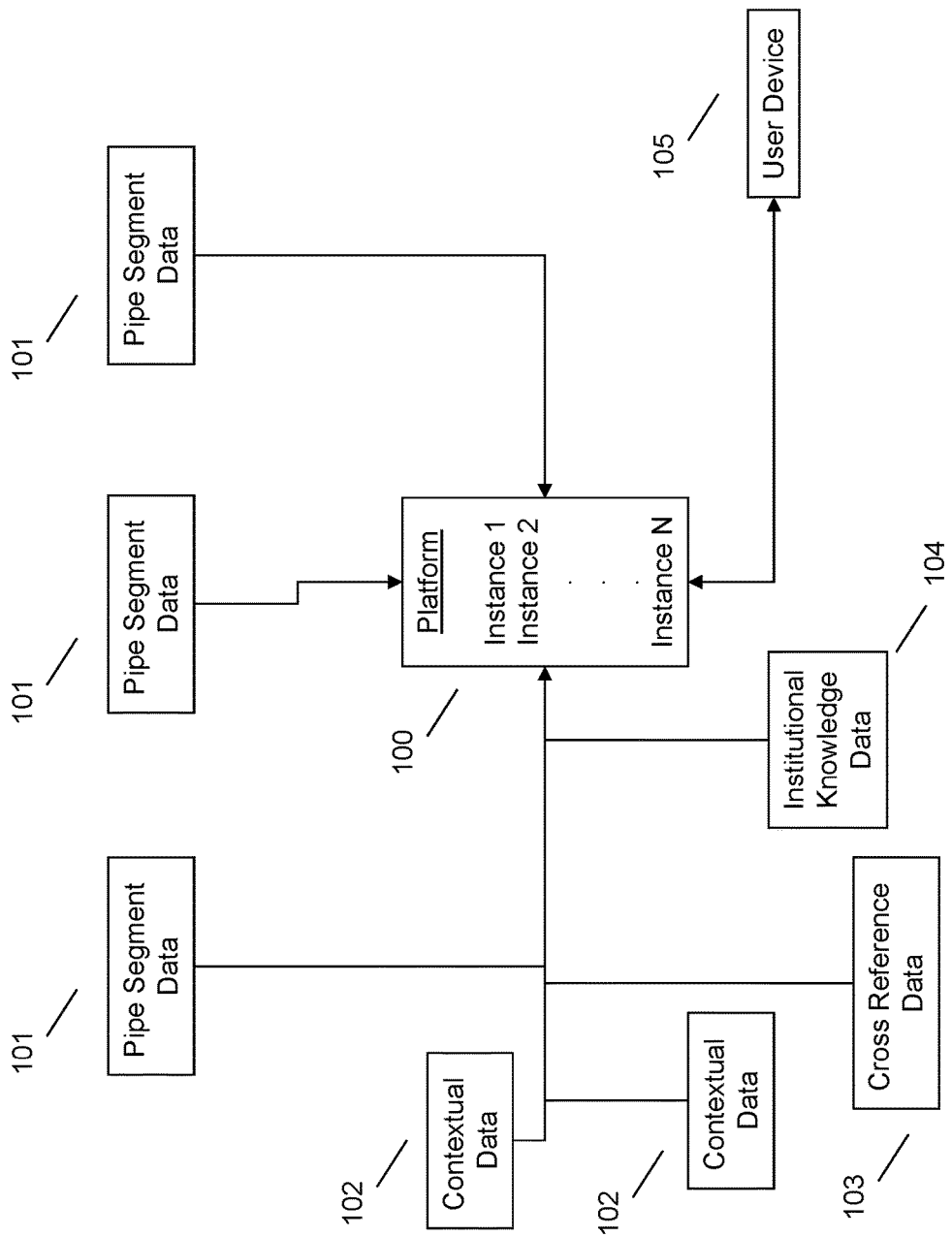
FIG. 1 illustrates an example platform system for analyzing pipe data.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid obfuscation.

Pipe networks are used to for a variety of purposes. Over time, issues may arise in various pipe segments of a pipe network. For example, different types of sediment deposits may accumulate in these networks that may impede the flow of materials. Additionally, the pipes may experience various other forms of damage such as cracks or corrosion. For these reasons, the pipes need to be routinely checked and inspected.

One current method to assist in pipeline inspection involves individuals physically entering into a pipe segment and inspecting its condition. However, this takes a great deal of time and effort. Furthermore, if the pipe is of smaller diameter, then additional measures need to be taken to access the pipe's interior, e.g., entry and inspection via a pipe inspection robot.

As noted hereinabove, even if a pipe inspection robot is utilized, the resultant data produced by conventional systems is often difficult for the end user to grasp. The pipe inspection data may be processed to relate 2D and 3D information of the pipe's interior; however, this data is often difficult to interpret visually in 2D display formats. Moreover, for a given pipe segment, although its inspection data (e.g., images, video, graphics, etc.) may be relevant and understood by the end user, its place or overall context within the larger pipe network may be difficult to grasp, as some pipe networks are quite extensive.

These technical issues present problems for end users that need to make decisions regarding the pipe network, e.g., city manages that must decide whether to expend resources rehabilitating or replacing particular segments of pipe within a pipe network. Since simply visualizing static 2D images or graphics, or even viewing video data of the interior of the pipe, may be difficult, an end user still may not have a clear understanding of the relevant issues presented by the pipe inspection data. More particularly, the best way to appreciate the condition of a pipe segment, and its relevance to an overall network, may be to physically inspect the pipe segment or even the entire network. As will be readily apparent, this is often simply not a viable option.

Accordingly, an embodiment provides a method for more effectively visualizing the interior of a pipeline by using a virtual reality (VR) system. Users may attain a better perspective for the condition of a particular pipe segment, and where it is located within a pipe network, by utilizing a VR system.

In an embodiment, pipe inspection data (e.g., visual images and/or video, laser scan data, sonar inspection data, etc.) are obtained from a mobile inspection robot that traverses the interior of a pipe segment.

In an embodiment, the pipe inspection data may undergo processing prior to its presentation in a VR system. For example, visual images, video data, and laser or sonar scan data obtained from a circular (or other shape) pipe interior may be de-warped for projection on a flat, 2D surface. This provides for a 2D display of the data, e.g., onto a flat screen or a projection display.

An embodiment may additionally process the pipe inspection data such that it may be projected into a VR system, e.g., a head mounted display. Therefore, an embodiment permits users to attain a 360 degree view of the projected images, e.g., by wearing a pair of VR goggles. Through this 360 degree view, individuals may gain a better perspective of the condition of the interior of pipe segments, i.e., as if they had physically entered the interior of the pipe itself The description now turns to the figures. The illustrated example embodiments will be best understood by reference to the figures. The following description is intended only by way of example and simply illustrates certain selected example embodiments.

Referring to FIG. 1, an embodiment provides a platform 100 that receives pipe data from a variety of sources. For example, the platform 100 receives pipe segment data 101, e.g., pipe inspection data collected with a pipe inspection robot(s) at a given time and synchronized with a particular location within a pipe segment (either at the time of collection in a post processing procedure). The platform 100 may also receive contextual data 102 from a variety of sources, such as remotely connected devices storing relevant infrastructure information. For example, contextual data 102 may include pipe segment location data, service call history data for a pipe segment or type, geographic data indicating proximity of pipe segments to water bodies, data regarding the inclination of a pipe segment, data regarding previous maintenance of pipe segments and contractors, techniques and costs associated therewith, etc. The platform 100 may also receive cross reference data 103, for example reference or comparable infrastructure information from other cities, municipalities, etc., as well as best practices data, contractor related data, cost data, and the like. The platform 100 may also receive institutional knowledge data 104, for example text or video notes of an employee familiar with a particular infrastructure asset or feature type.

This permits platform 100 to provide instances of the pipe segment data 101, the contextual data 102, the cross reference data 103, and the institutional knowledge data 104, or combinations of the foregoing, to a user device 105, e.g., laptop computing device, tablet computing device, head mounted display system, etc. By way of example, the platform 100 may take pipe segment data 101 in the form of 2D visual images from the circular interior of a pipe segment, create de-warped images from the 2D visual images such that they may be projected on a flat 2D plane (e.g., a flat panel display screen), and communicate these de-warped images to a user device 105. Likewise, the platform 100 may combine the visual image data with other data, e.g., contextual data 102, etc., to form a composite image or image having an overlay of text and/or graphics. Furthermore, processing may be applied by the platform 100 to prepare pipe segment data 101 and/or other data for projection within a VR system, as further described herein.

Figure 2:
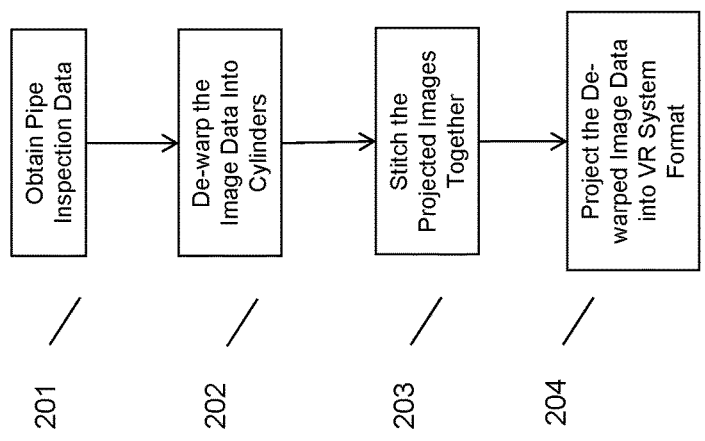
FIG. 2 illustrates an example method of providing pipe data to a virtual reality setting.

Referring now to FIG. 2, at 201, an embodiment obtains pipe inspection data, e.g., visual image data, laser scan data, etc., of a particular segment of a pipe. The pipe inspection data may be collected by at least one sensor or an array of sensors mounted to a mobile inspection robot. For example, a camera or camera array of the mobile inspection robot may be equipped with a single camera (e.g., having a fisheye lens) or an array of cameras for obtaining image data of substantially the entire pipe interior for a particular pipe segment, e.g., in 360 degrees. Fisheye lenses allow for the production of extremely wide-angled images. For example, the angle of view of a fisheye lens may be between 100 and 180 degrees. A fisheye image enables large surface coverage with a minimal amount of image captures. This aspect of the fisheye lens makes it possible to create complete panoramic views for virtual reproduction. In an embodiment, the fisheye lens may be, but is not limited to, a circular fisheye lens or a full-frame fisheye lens.

At 202 an embodiment may de-warp the collected images in order to format them appropriately for a particular type of display. By way of example, a warped image captured by a fisheye lens may be de-warped for display on a flat panel screen. De-warping is a process of correcting a fisheye image's perspective view by flattening the image out into a traditional 2D format but with the benefit of attaining all the detail that a wide-angled view provides).

As another example, a warped image from a fisheye lens may be de-warped and thereafter projected onto a particular shape, e.g., a cylinder representing the physical shape of the pipe interior. In an embodiment, the de-warping and other image processing may take place on a separate computer that utilizes de-warping or distortion processing software, e.g., on platform 100 or a user device 105. In an embodiment, the image processing may take place locally on the mobile inspection robot.

At 204 an embodiment may stitch the processed (e.g., de-warped, projected) images together in order to form a complete 360 degree view of a particular pipe segment and/or to from a continuous view of adjacent pipe segments. Thus, image processing may be applied to form a composite or combination image, whereby the individual images of a single pipe segment are formed into a 360 degree view of the particular segment. Additionally, an embodiment may form composite or combined images representing adjacent 360 pipe segment views, e.g., for use in a VR system display, as further described herein.

In an embodiment, the stitched images are appropriately modified for projection or presentation on a given virtual reality system display. For example, a given VR system may utilize a particular VR display type for which images are to be customized. This may involve processing the images such that they are amenable to display in the VR system's display.

In an embodiment, a computer program stitches or combines the images together to produce a continuous virtual environment map of the pipe network of portion thereof. A virtual environment map can be used to render 3D objects and virtual panoramic scenes, with the latter being used as a representative example herein.

It should be noted that additional pipe inspection data or other data (e.g., laser scanning data, textual data, telemetry data, etc.) may be paired or combined with the projected virtual panoramic scenes formed from visual images in order to provide the user with more information regarding a pipe segment that is being viewed in a VR system. By way of example, telemetry data may consist of laser pipe condition assessment data and sonar pipe condition assessment data. The telemetry data may be projected into the virtual reality system, e.g., overlaid on the virtual panoramic scenes as a text or graphic.

In another embodiment, image data other than visual image data may be used as the raw image input data that is processed (e.g., projected onto a given shape) and utilized for VR display. By way of example, a laser scan may be performed by a mobile inspection robot, whereby laser reflection data is sensed and used to determine distance information regarding a distance between the laser origin and sensor. This data in turn may be used to compose an image of the pipe's interior. As such, this data may also be used for forming a VR system display image, e.g., virtual panoramic image derived from the laser scan data. As will be apparent to those having skill in the art, various other data sources may be used to form VR images.

At 204 an embodiment may project the de-warped images into a VR system. Examples of VR systems include the OCULUS RIFT, SAMSUNG GEAR or HTC VIVE VR systems. The VR system may contain a head mounted display including one or more screens, such as projections screens that present a VR image to the user. This provides the user with a better visual perspective of the surroundings. Additionally, VR systems permit the user to move about within the image virtually, e.g., to pan or zoom to a particular part of the image. Moreover, an animation or predetermined image presentation routine may be presented. By way of example, a user may be presented with VR images for a first pipe segment and thereafter be automatically shown a next pipe segment, e.g., as if the user was walking along the length of the pipe. This process may proceed automatically or according to user input, e.g., to move about within the pipe virtually. OCULUS RIFT is a registered trademark of Oculus VR, LLC in the United States and other countries. SAMSUNG GEAR is a registered trademark of Samsung Electronics Co., LTD in the United States and other countries. HTC VIVE is a registered trademark of HTC Corporation in the United States and other countries.

If a feature of interest to the user appears within the VR display, e.g., a sediment deposit is found shown the pipe wall, a user may focus or direct the VR view in this area. Additional data may also be presented, e.g., in response to a user input (such as voice input, gesture input, manual input, etc.). By way of specific example, a user may provide input to display additional data (e.g., telemetry text or graphics) on seeing a feature of interest within the VR display (e.g., sediment deposit, corrosion, crack, etc.). Likewise, a user viewing a VR display formed of visual images may choose to switch data sources, e.g., to laser scan data, responsive to seeing a feature of interest. Thus, a user may be provided with additional data, e.g., material construction of the pipe, the pipe segment's age, maintenance history, or the like.

In an embodiment, the image processing (i.e. the steps of de-warping, projecting, and stitching, etc.) may occur in post-processing or real time. Real time image processing may leverage localized de-warping at the camera-level to allow individuals to visualize a live virtual environment while operating an inspection robot.

Figure 3:
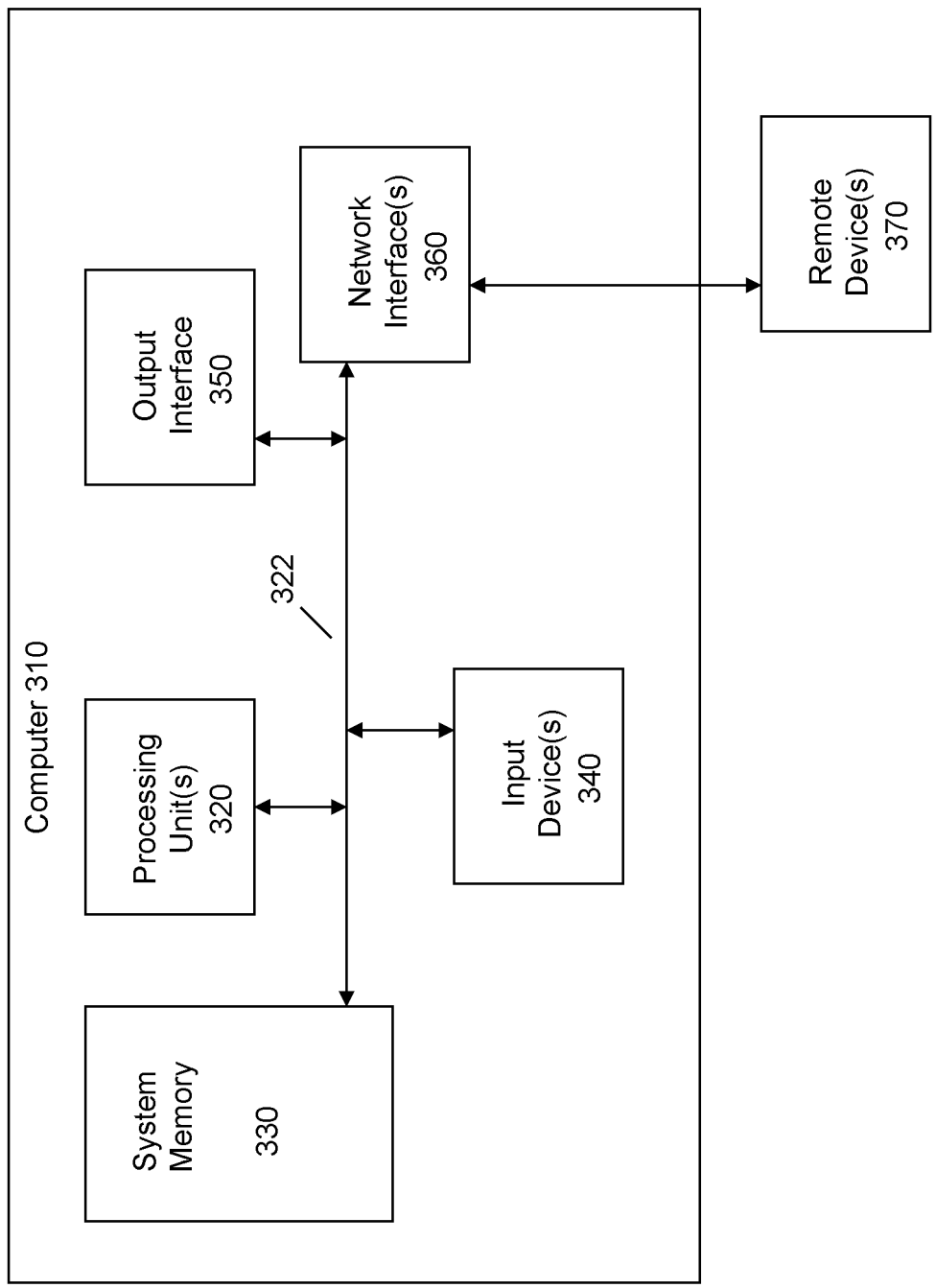
FIG. 3 illustrates an example computing device.

It will be readily understood that certain embodiments can be implemented using any of a wide variety of devices or combinations of devices. Referring to FIG. 3, an example device that may be used in implementing one or more embodiments includes a computing device (computer) 310, for example included in a mobile inspection robot, a platform 100, and/or a VR system component.

The computer 310 may execute program instructions configured to store an analyze pipe data and perform other functionality of the embodiments, as described herein. Components of computer 310 may include, but are not limited to, a processing unit 320, a system memory 330, and a system bus 322 that couples various system components including the system memory 330 to the processing unit 320. The computer 310 may include or have access to a variety of computer readable media. The system memory 330 may include computer readable storage media in the form of volatile and/or nonvolatile memory devices such as read only memory (ROM) and/or random access memory (RAM). By way of example, and not limitation, system memory 330 may also include an operating system, application programs, other program modules, and program data.

A user can interface with (for example, enter commands and information) the computer 310 through input devices. A monitor or other type of device can also be connected to the system bus 322 via an interface, such as an output interface 350. In addition to a monitor, computers may also include other peripheral output devices. The computer 310 may operate in a networked or distributed environment using logical connections to one or more other remote computers or databases. The logical connections may include a network, such local area network (LAN) or a wide area network (WAN), but may also include other networks/buses.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device to produce a special purpose machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method of projecting pipe data into a virtual reality (VR) system, comprising:
    obtaining, using a pipe inspection robot that traverses through an interior of a pipe, pipe inspection data comprising one or more of laser scan data, sonar scan data, and visual image data, wherein reflection data is sensed and used to determine distance information regarding a distance between one or more of a laser origin and a sonar origin and a sensor;
    synchronizing, using a processor, the pipe inspection data with a location within the pipe;
    composing, using the processor, a scan image of the location using one or more of the laser scan data and the sonar scan data, the scan image representing a physical shape of the interior of the pipe based on the distance information;
    formatting, using a processor, the visual image data and the scan image for virtual panoramic display, the formatting comprising:
        projecting the scan image onto a cylinder representing the physical shape of the interior of the pipe to form a scan VR display image; and
        projecting the visual image data onto a cylinder representing the physical shape of the interior of the pipe to form a visual VR display image;
    providing, using the processor, the scan and visual VR display images to a VR system comprising a head mounted display;
    wherein the scan and visual VR display images provide different data source VR images of the location for switching between display of the visual VR display image and the scan VR display image based on user input.

2. The method of claim 1 wherein the pipe inspection data further comprises additional data.

3. The method of claim 2, wherein the processing comprises combining the additional data with one or more of the scan and visual VR display images.

4. The method of claim 3, wherein the combining comprises including the additional data as a text or graphic overlay.

5. The method of claim 1, wherein the providing proceeds in real time.

6. A system, comprising:
    a pipe inspection robot that traverses through an interior of a pipe and comprises at least one sensor that obtains pipe inspection data comprising one or more of laser scan data, sonar scan data, and visual image data, wherein reflection data is sensed and used to determine distance information regarding a distance between one or more of a laser origin and a sensor origin and the at least one sensor; and
    a computing device including a processor that:
        synchronizes the pipe inspection data with a location within the pipe;
        composes a scan image of the location using one or more of the laser scan data and the sonar scan data, the scan image representing a physical shape of the interior of the pipe based on the distance information;
        formats the visual image data and the scan image for virtual panoramic display, wherein the processor is configured to: project the scan image onto a cylinder representing the physical shape of the interior of the pipe to form a scan virtual reality (VR) display image; and project the visual image data onto a cylinder representing the physical shape of the interior of the pipe to form a visual VR display image;
        provides the scan and visual VR display images to a VR system comprising a head mounted display;
    wherein the scan and visual VR display images provide different data source VR images of the location for switching between display of the visual VR display image and the scan VR display image based on user input.

7. The system of claim 6, wherein the at least one sensor comprises a camera having a wide angle lens.

8. The system of claim 6, wherein the at least one sensor comprises a camera array.

9. The system of claim 6, wherein the pipe inspection data further comprises additional data.

10. The system of claim 9, wherein the computing device combines the additional data with one or more of the scan and visual VR display images.

11. The system of claim 10, wherein the additional data is included as a text or graphic overlay.

12. The system of claim 6, wherein the computing device is physically attached to the pipe inspection robot.

13. A computer program product, comprising:
    a computer readable storage device having code embodied therewith, the code being executable by a processor and comprising:
    code that receives pipe inspection data derived from a pipe inspection robot that traverses through an interior of a pipe, the pipe inspection data comprising a scan image and a visual image of a location of the interior of the pipe, the scan image being based on reflection data that is sensed and used to determine distance information regarding a distance between one or more of a laser origin and a sensor origin and a sensor;
    wherein the scan image and the visual image are synchronized with a location within the pipe, the scan image representing a physical shape of the interior of the pipe based on the distance information;

code that formats for virtual panoramic display the scan image and the visual image by projection of the scan image and the visual image onto a cylinder representing the physical shape of the interior of the pipe;

code that displays, on a head mounted display device, one or more of the scan image and the visual image as a virtual panoramic display;

code that receives user input to switch the virtual panoramic display; and code that switches the virtual panoramic display between a visual image panoramic display and a scan image virtual panoramic display in response to the user input.

14. The computer program product of claim 13, comprising code that modifies the virtual panoramic display to update a view perspective to a new area of the virtual panoramic display.

15. The computer program product of claim 13, comprising code that modifies the virtual panoramic display to add additional data in the form of text or a graphic.

* * * * *